US008342253B2

(12) United States Patent
Gisler

(10) Patent No.: US 8,342,253 B2
(45) Date of Patent: Jan. 1, 2013

(54) METHODS AND APPARATUS FOR TILLING SOIL

(76) Inventor: Henry Carl Gisler, Langley (CA)

( * ) Notice: Subject to any disclaimer, the term of this patent is extended or adjusted under 35 U.S.C. 154(b) by 0 days.

(21) Appl. No.: 13/069,359

(22) Filed: Mar. 22, 2011

(65) Prior Publication Data

US 2012/0241178 A1 Sep. 27, 2012

(51) Int. Cl.
*A01B 79/00* (2006.01)
(52) U.S. Cl. .............................. 172/1; 172/302
(58) Field of Classification Search .............. 172/1, 810, 172/273, 297, 311
See application file for complete search history.

(56) References Cited

U.S. PATENT DOCUMENTS

| | | | | |
|---|---|---|---|---|
| 1,213,912 A * | 1/1917 | Sergeant | ........................ | 172/202 |
| 1,554,037 A * | 9/1925 | Salberg | .......................... | 172/161 |
| 1,964,559 A * | 6/1934 | Collins | .......................... | 172/153 |
| 2,608,924 A * | 9/1952 | Bywater et al. | ............... | 172/810 |
| 2,796,816 A * | 6/1957 | Gray | ............................. | 172/162 |
| 2,881,581 A * | 4/1959 | Evans et al. | .................... | 172/302 |
| 3,071,198 A * | 1/1963 | Blocker | ........................ | 172/123 |
| 3,080,930 A * | 3/1963 | Morkoski et al. | ............. | 172/298 |
| 3,145,781 A * | 8/1964 | Rogler | .......................... | 172/810 |
| 3,224,392 A * | 12/1965 | Mellen | ............................ | 111/52 |
| 3,265,137 A * | 8/1966 | Couser | .......................... | 172/307 |
| 3,944,000 A * | 3/1976 | van der Lely et al. | ....... | 172/49.5 |
| 4,077,189 A | 3/1978 | Hering | | |
| 4,181,181 A * | 1/1980 | Old | ............................... | 172/443 |
| 4,422,512 A * | 12/1983 | Hodgson et al. | ............... | 172/454 |
| 4,431,061 A * | 2/1984 | White | ........................... | 172/810 |
| 4,453,601 A | 6/1984 | Orthman et al. | | |
| 4,611,668 A * | 9/1986 | Hrubes | ......................... | 172/134 |
| 4,632,417 A | 12/1986 | Hodapp | | |
| 4,693,331 A * | 9/1987 | Johnson et al. | ............... | 180/419 |
| 5,161,622 A * | 11/1992 | Godbersen | ..................... | 172/140 |
| 5,172,769 A * | 12/1992 | Lunsford, Jr. | ................. | 172/162 |
| 5,407,015 A * | 4/1995 | Swords et al. | ................ | 172/200 |
| 5,713,421 A * | 2/1998 | Skjaeveland | .................. | 172/161 |
| 5,845,717 A * | 12/1998 | Gillespie | ....................... | 172/833 |
| 5,979,567 A | 11/1999 | Green et al. | | |
| 2004/0188109 A1 | 9/2004 | Domries | | |

FOREIGN PATENT DOCUMENTS

CA 2207250 3/1998

OTHER PUBLICATIONS http://www.frontlinkinc.com/einbock/cultivators-and-hoes/sugard-beet-hoe-chopstar.html, Jun. 5, 2010.

* cited by examiner

*Primary Examiner* — Thomas B Will
*Assistant Examiner* — Joel F. Mitchell
(74) *Attorney, Agent, or Firm* — Oyen Wiggs Green & Mutala LLP

(57) ABSTRACT

A method of soil preparation simultaneously ploughs soil and tills soil ploughed in a previous pass. An apparatus for tilling soil provides tilling members mounted for deployment on either side of a tractor. The tilling members on one side of the tractor may be brought into engagement with the soil while tilling members on the other side of the tractor are lifted away from the soil. The tilling members are located to coincide with an adjacent strip of land ploughed in a previous pass of the tractor.

6 Claims, 12 Drawing Sheets

METHODS AND APPARATUS FOR TILLING SOIL

TECHNICAL FIELD

This invention relates to agriculture. In particular, the invention relates to tilling soil in preparation for planting crops.

BACKGROUND

Preparing a field for planting crops involves a number of steps. Typically, the field is first ploughed. Ploughing turns a top layer of soil over. Plants growing in the top layer of soil are under the top layer after ploughing. This plant matter can decay to build the soil and provide nutrition for the current-year's crop. This plant matter is known as 'green fertilizer'.

One or more additional preparation steps are typically performed after ploughing to break up the soil. Breaking up the soil makes it easier for a new crop to establish itself and to access nutrients in the soil and also facilitates planting. A harrow is a tool commonly used for this purpose. One type of harrow is a disc harrow. The disc harrow has a number of rows of disc-like blades that cut the soil as they pass through it. After ploughing a farmer may pull a disc harrow (or other harrow) over the ploughed field to break up the soil sufficiently to allow a new crop to be planted.

Soil compaction resulting from driving repeatedly over the field with heavy equipment can harm the land. Repeated passage of tractors or other equipment can seal off the natural passages by way of which air and water can penetrate the soil.

The field of agriculture is becoming increasingly competitive. Farmers work hard to reduce their cost of production. Field preparation involves significant costs because it typically involves traveling over every part of the field to be prepared multiple times. This results in very significant costs for fuel as well as wear and tear on expensive tractors. Labour costs can also be significant.

Over the years farmers have taken advantage of a number of developments that help to reduce costs of production. One of these developments is the tumble plough. Because ploughs are "handed" a farmer cannot simply plough a furrow to one end of the field and then turn around and plough another furrow adjoining the just-ploughed area. This would result in the soil being turned over in one direction for the first furrow (or set of furrows in the case of a multi-bottom plough) and turned over in the opposing direction on the return trip.

A tumble plough has two sets of plough shares. The two sets are oppositely handed (one set turns the soil over to the right-hand side of the tractor as the tractor pulls the plough ahead and the other set turns the soil over to the left-hand side of the tractor as the tractor moves ahead). Using a tumble plough, a farmer can plough a set of furrows along a field in one direction. When the farmer reaches the end of the field, the farmer can lift the plough shares clear of the ground, flip the plough over to bring the second set of plough shares into operating position, turn around in a U-turn, drop the plough into engagement with the ground and plough another set of furrows immediately next to the just-ploughed area. This significantly increases efficiency and can save both fuel and labour costs in ploughing the field (at the cost of the capital investment in a tumble plough).

There remains a need for methods and apparatus useful in soil tilling which provide further savings in time and/or fuel.

SUMMARY

The following embodiments and aspects thereof are described and illustrated in a way that is meant to be exemplary and illustrative, not limiting in scope. The invention has a number of aspects. These include novel agricultural soil tilling implements; tractors equipped with soil tilling implements; and methods for tilling soil.

One aspect of the invention provides a method for preparing soil. The method comprises: with a tractor, pulling a plough to plough a first strip of ploughed land; driving the tractor adjacent to the first strip pulling the plough to plough a second strip of ploughed land contiguous with the first strip; and, while ploughing the second strip, tilling the first strip with a first tiling member mounted to the tractor and projecting to a first side of the tractor.

Another aspect of the invention provides soil tilling apparatus comprising: a member bearing tilling members that is mounted to a tractor and is movable between a lowered configuration in which the tilling members engage the soil across a strip of soil offset to one side of the tractor and a raised configuration wherein the tilling members are lifted away from the soil and an actuator coupled to move the member between its lowered and raised configurations.

Another aspect of the invention provides an agricultural implement comprising: a hitch configured for coupling the agricultural implement to a tractor; a frame supported by the hitch; first and second arms pivotally mounted to the frame; tilling members mounted to the first and second arms. The first and second arms are each pivotally movable between raised and lowered configurations. When the first arm is in its lowered configuration, the corresponding tilling members are positioned to engage the ground in a first strip that is offset to a first side of the tractor. When the second arm is in its lowered configuration, the corresponding tilling members are positioned to engage the ground in a second strip that is offset to a second side of the tractor opposed to the first side. The first and second strips are spaced apart from one another by a third strip. The implement may be mounted to a tractor in combination with a plough with the plough dimensioned such that a strip ploughed by the plough lies substantially within the third strip.

Further aspects of the invention and features of example embodiments of the invention are described below and illustrated in the accompanying drawings.

BRIEF DESCRIPTION OF DRAWINGS

The accompanying drawings show non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Embodiments of this invention provide a front-mounted tilling assembly that may be used in conjunction with a plough. The tilling assembly can be controlled to till the soil that was ploughed on a previous pass of the tractor. The tilling assembly can be used most effectively in combination with a tumble plough.

Figure 1:
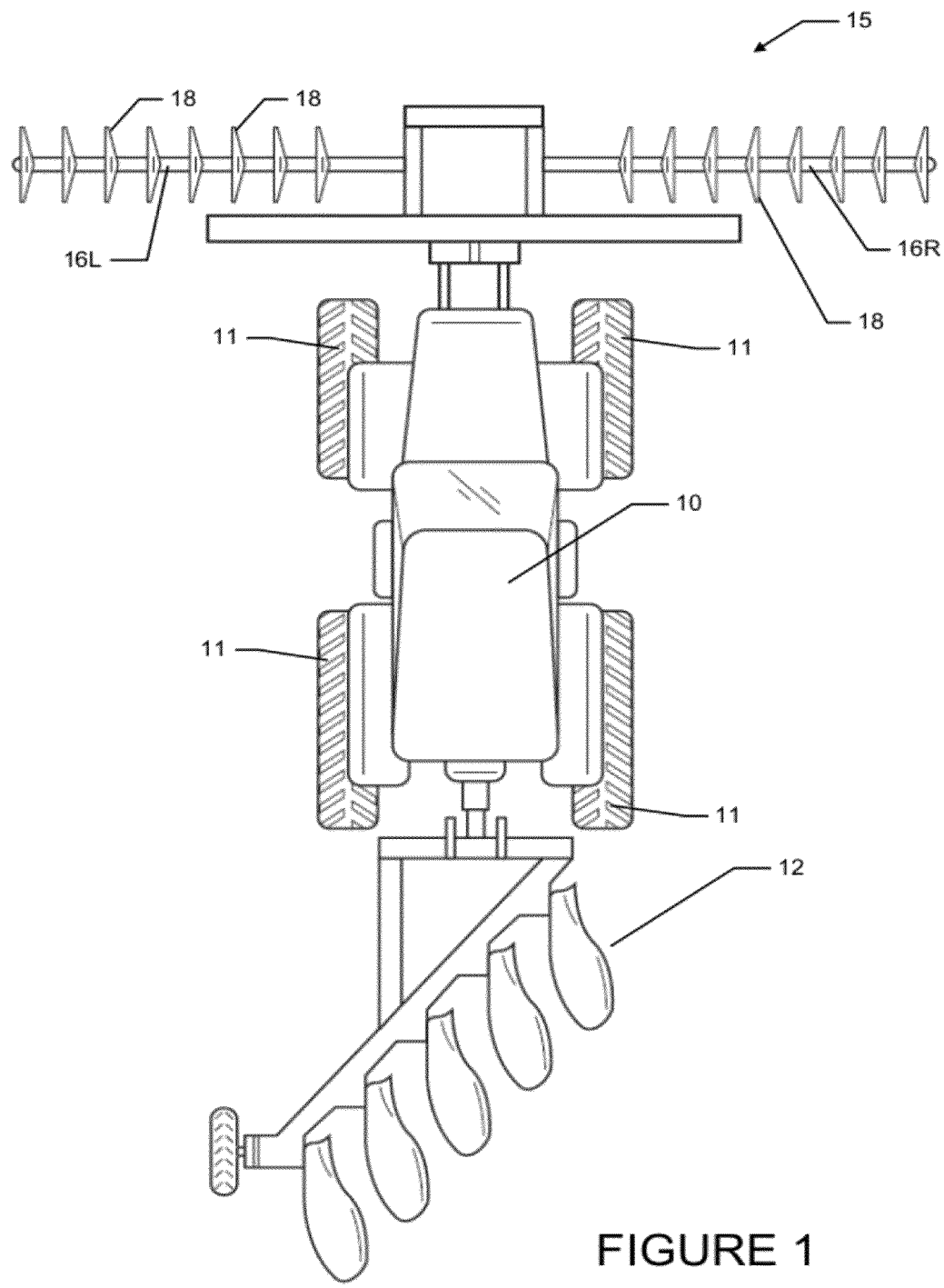
FIG. 1 is a top-view of a tractor pulling a tumble plough.
Figure 5:
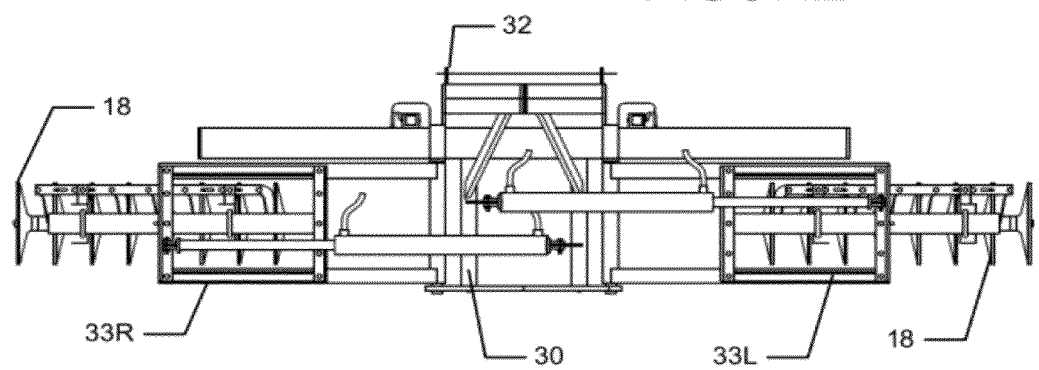
FIG. 5 is a top plan view of the implement of FIG. 3.
Figure 6:
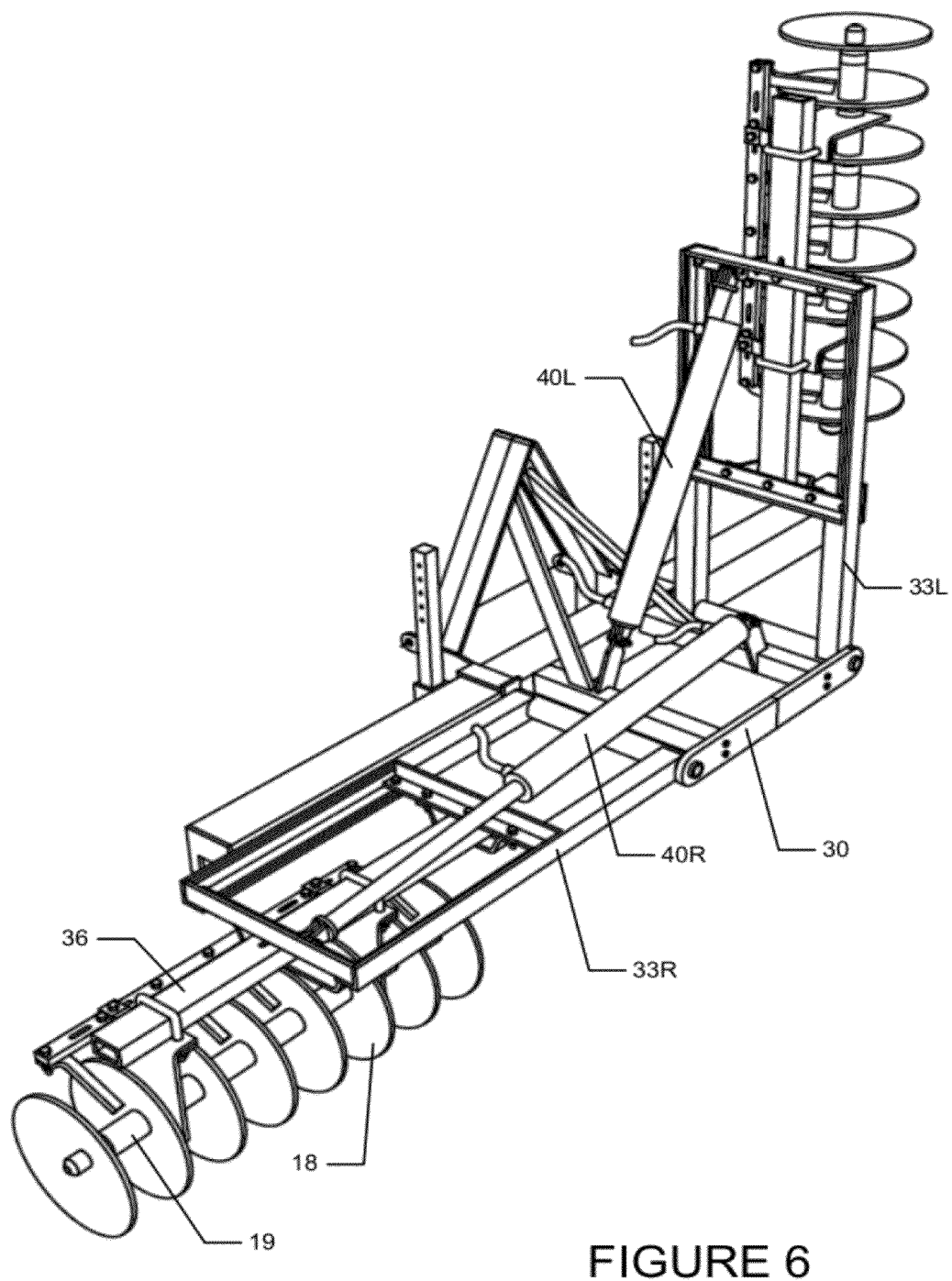
FIG. 6 is a perspective view of the implement of FIG. 3 in an operating mode with one arm raised.
Figure 7:
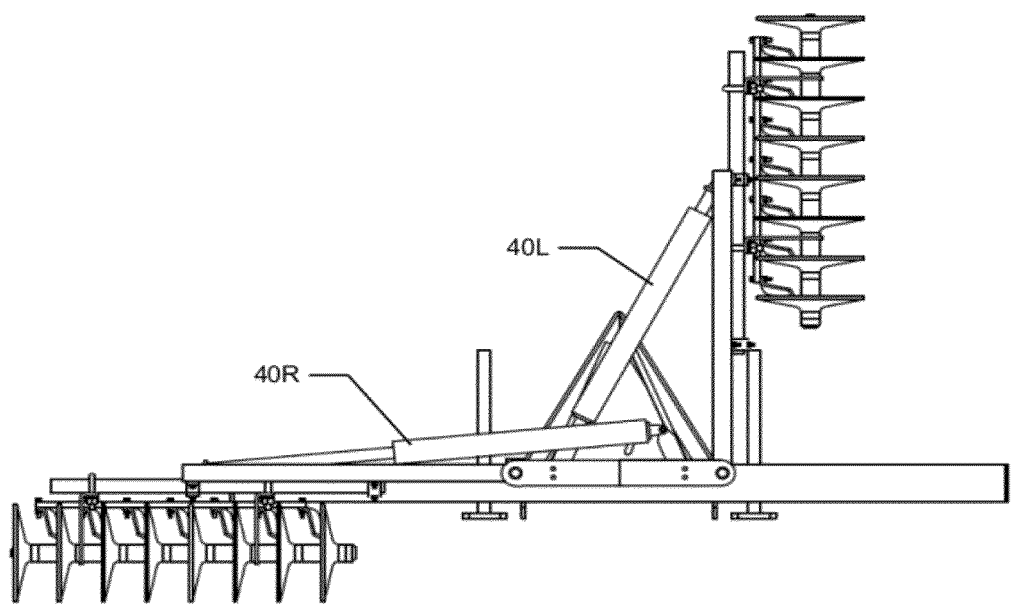
FIG. 7 is a front elevation view of the implement of FIG. 3 in an operating mode with one arm raised.
Figure 8:
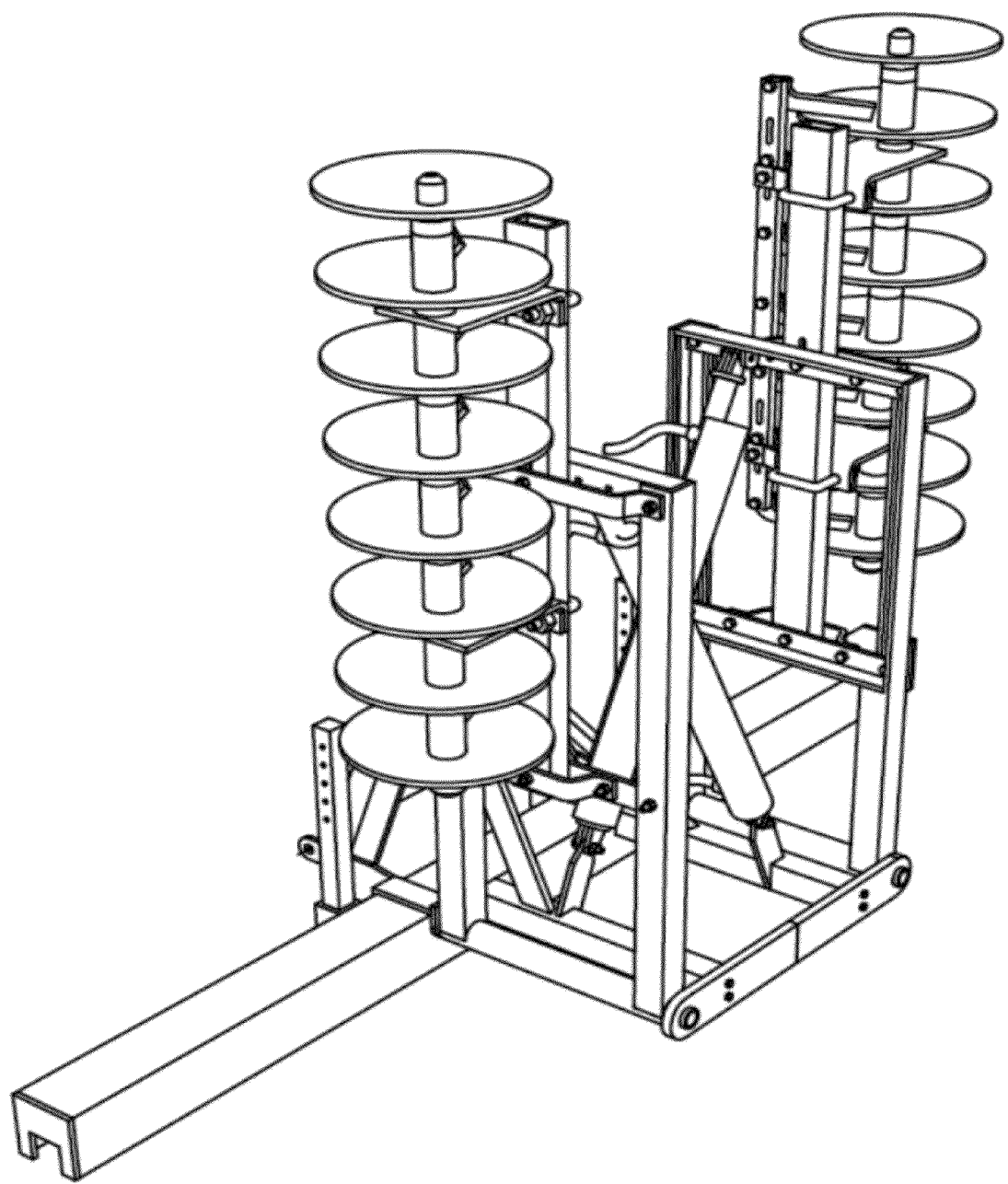
FIG. 8 is a perspective view of the implement of FIG. 3 in a transport configuration with both arms raised.
Figure 9:
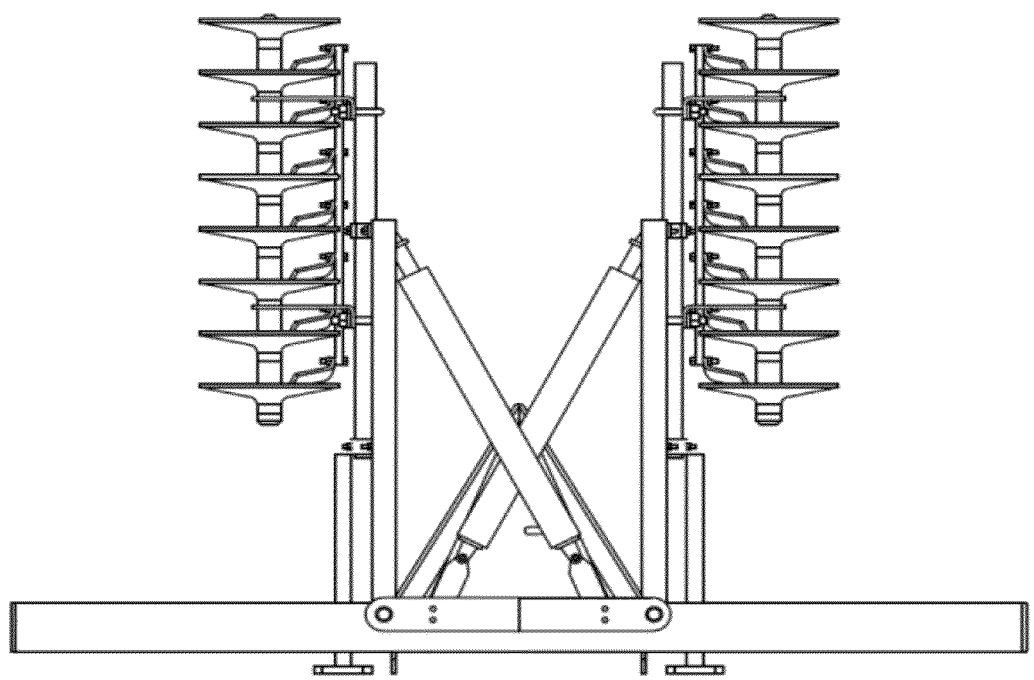
FIG. 9 is a front elevation view of the implement of FIG. 3 in a transport configuration with both arms raised.

FIG. 1 is a top-view of a tractor 10 pulling a tumble plough 12. A tilling apparatus 15 is mounted on the front of the tractor 10. Tilling apparatus 15 comprises arms 16R and 16L arranged to project respectively on the right and left-hand sides of tilling apparatus 15. Arms 16R and 16L each comprise tilling members. In the illustrated embodiment, the tilling members comprise disc blades 18. The tilling members may optionally comprise other blades or tines in addition to or in the alternative to disc blades. Disc blades 18 are mounted to shafts 19 (see FIG. 5) which are rotatably mounted to the corresponding arm 16R or 16L. Arms 16R and 16L can be lowered so that the corresponding disc blades 18 are in contact with and till the soil or raised so that the arm 16R or 16L is not in contact with the soil.

Figure 2A:
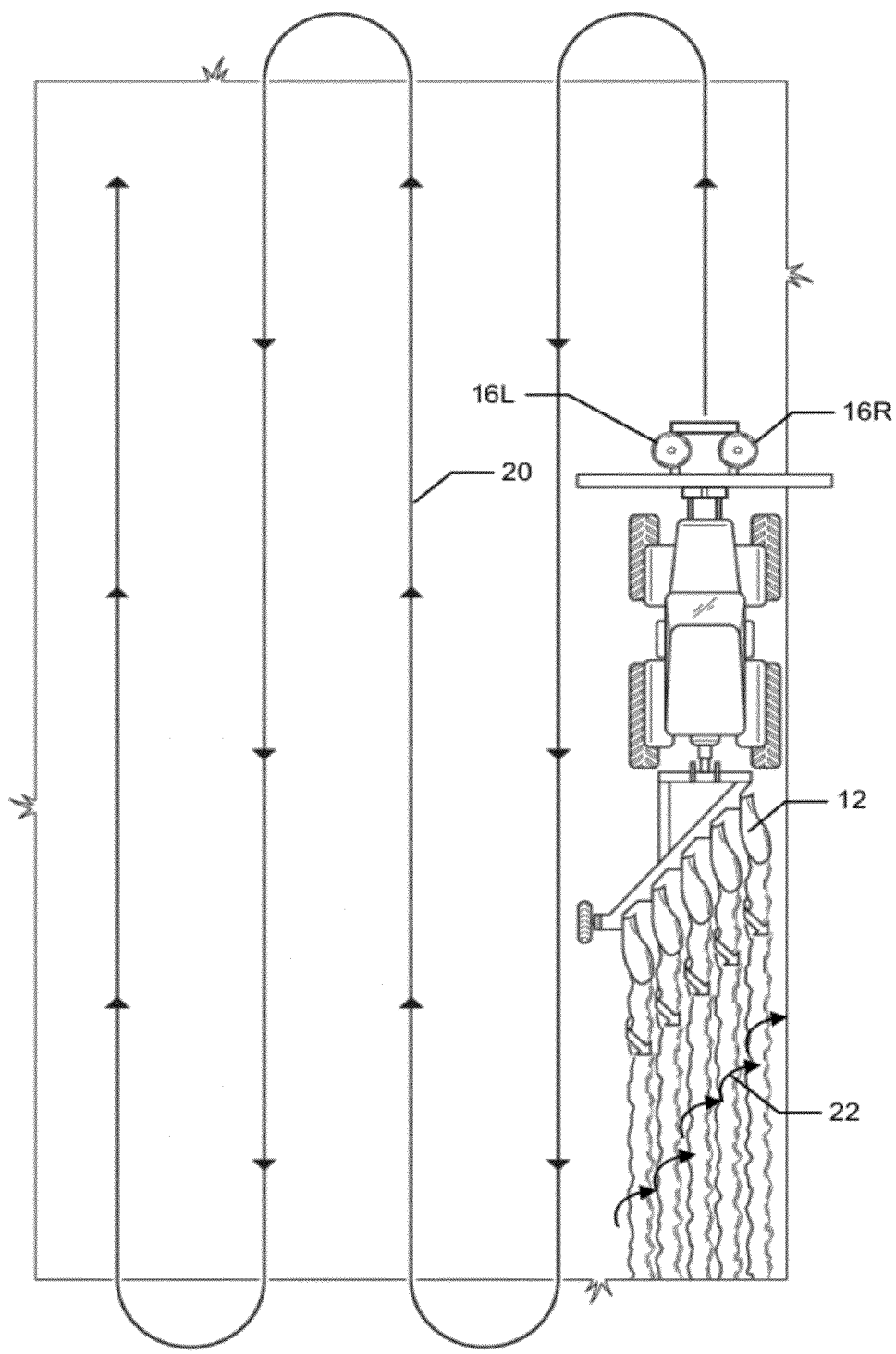
FIGS. 2A to 2C are top-views of a tractor ploughing a field according to a method the invention.

FIG. 2A is a top-view of a tractor 10 commencing to plough a field. The tractor will follow path 20 to allow plough 12 to cover the entire area of the field. In FIG. 2A, the tractor has commenced ploughing. The plough shares on plough 12 are turning over the soil towards the right-hand side of the tractor as indicated by arrows 22. Arms 16R and 16L are in their raised positions with disc blades 18 out of contact with the ground. The weight of arms 16R and 16L on the front end of tractor 10 provides front ballast that assists in maintaining traction (in the event that tractor 10 has driven front wheels 11).

Figure 2B:
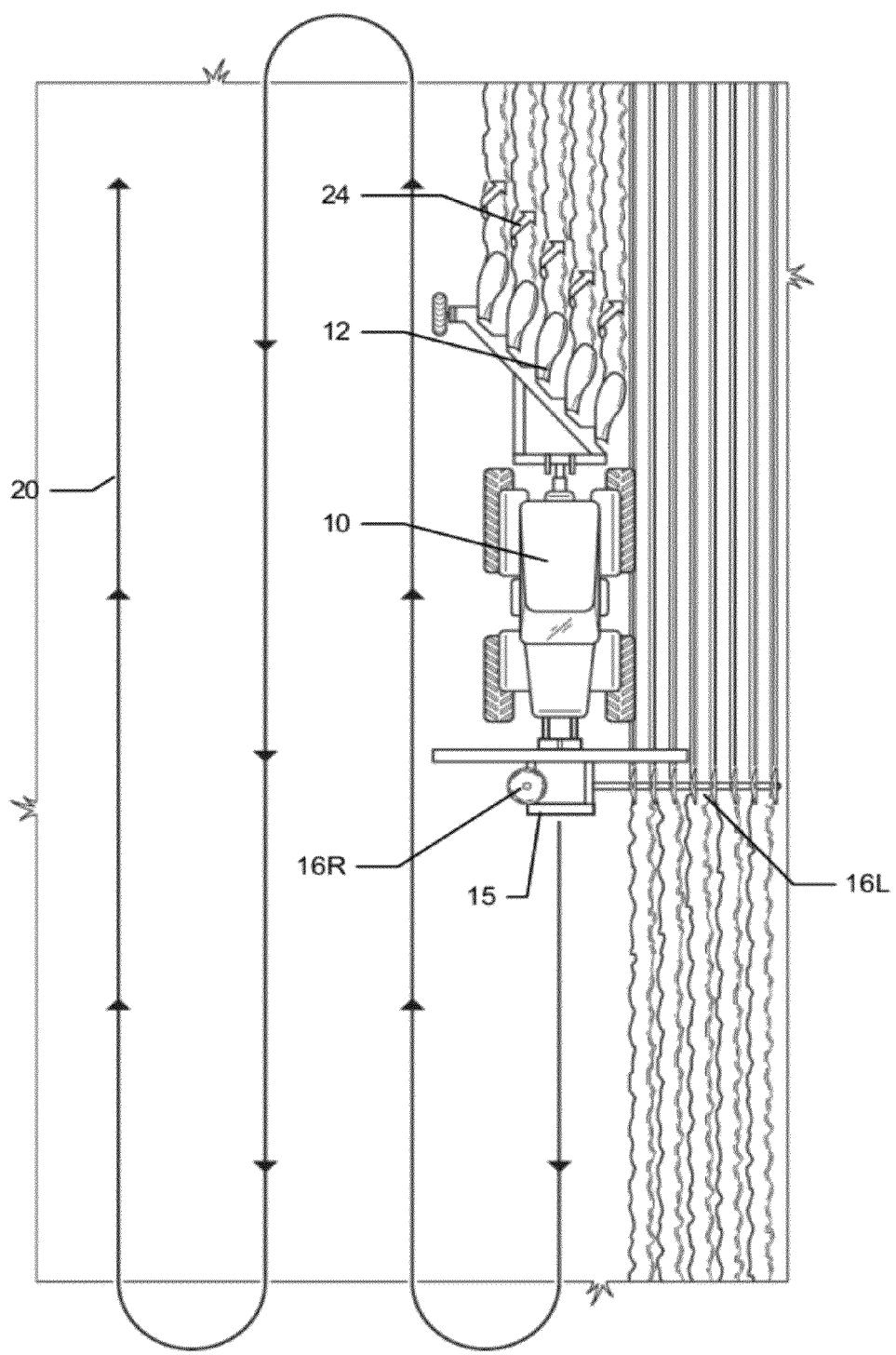

In FIG. 2B, tractor 10 has completed its first pass along the field and has turned around, flipped tumble plough 12 and started to proceed in the opposite direction. It can be seen that the tumble plough 12 is now ploughing so that soil is turned over toward the left-hand side of tractor 10 as indicated by arrows 24. Arm 16L has been lowered so that its tilling members (disc blades 18) are tilling the soil that was ploughed on the previous pass. Arm 16R remains in its raised position.

Figure 2C:
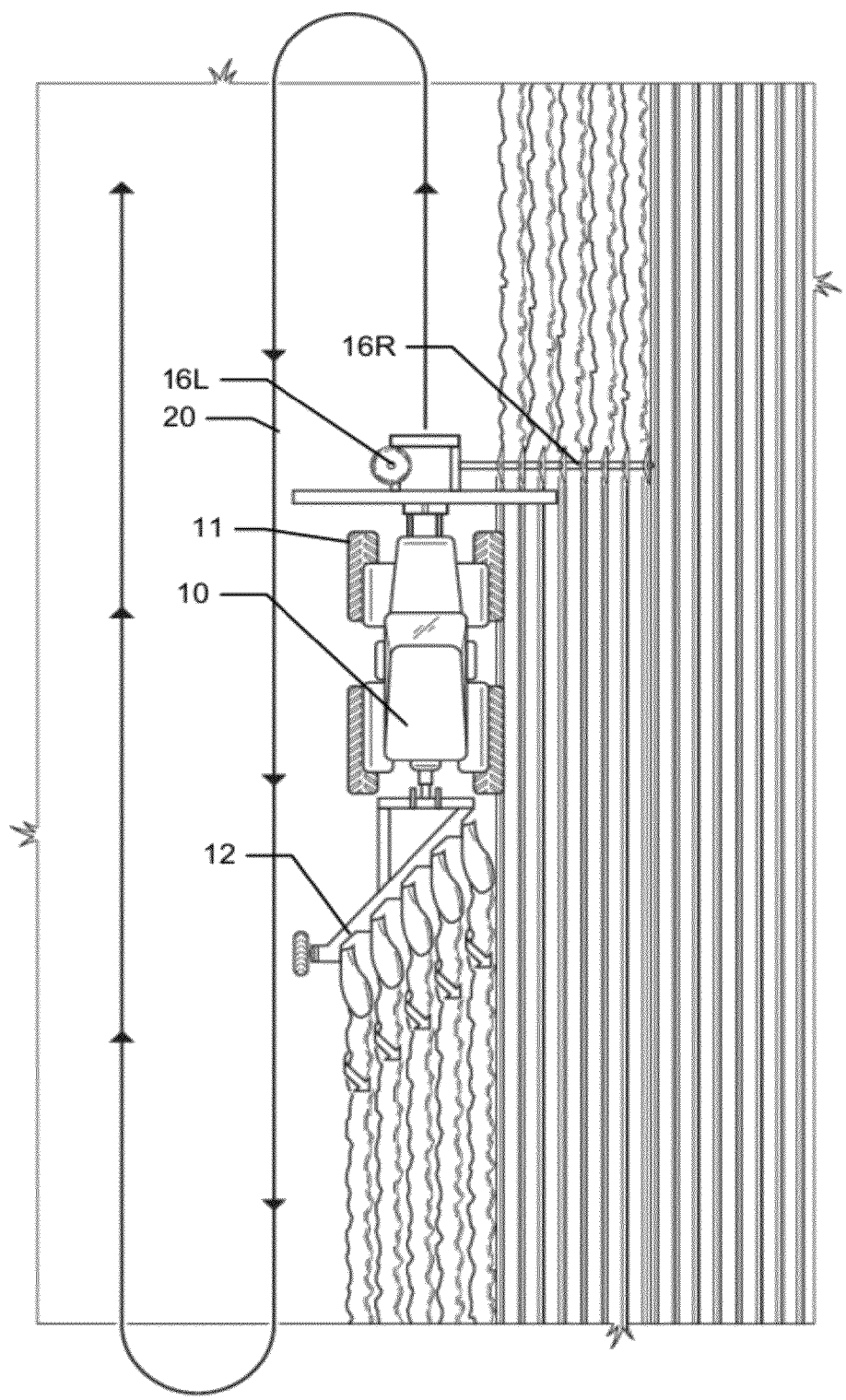
Figure 3:
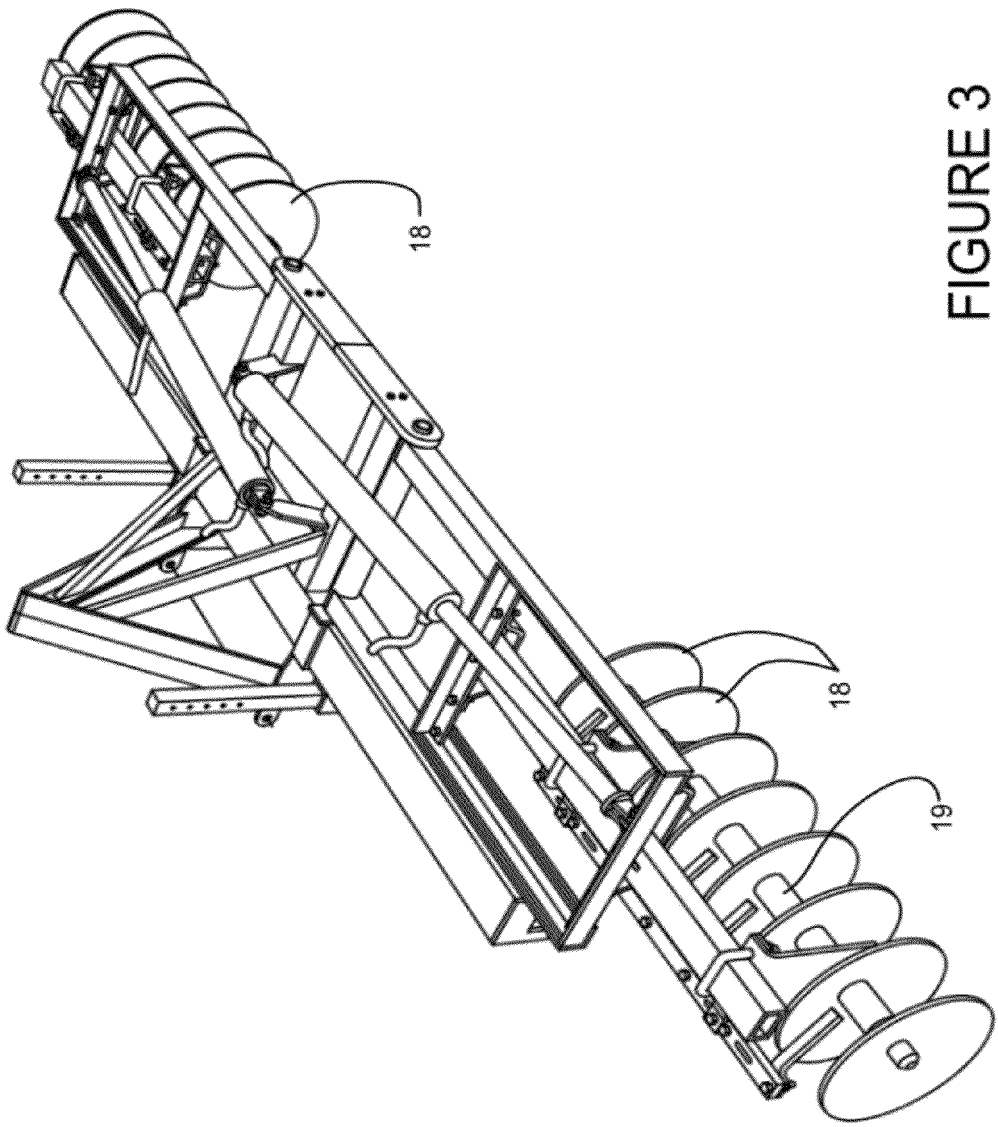
FIG. 3 is a perspective view of an implement according to an example embodiment.

FIG. 2C shows the field with the tractor on the next pass. The tumble plough 12 has been flipped again and is now ploughing so that soil is turned over towards the right-hand side of tractor 10. Arm 16R has been lowered to bring the corresponding tilling members (e.g. disc blades 18) into engagement with the ground ploughed on the previous pass. Arm 16L has been raised. The tilling members (disc blades 18) on the lowered arm 16R are tilling the soil turned over in the previous pass of plough 12.

By proceeding as described above, a farmer can both plough and till a field with a single pass over the field. Furthermore, since the tilling apparatus may comprise or be used in conjunction with a tumble plow, tractor 10 does not need to travel for any significant distances to transport plough 12 to a new starting point. Tractor 10 can cover the entire field by making U-turns to change direction when it reaches the ends of the field.

Figure 4:
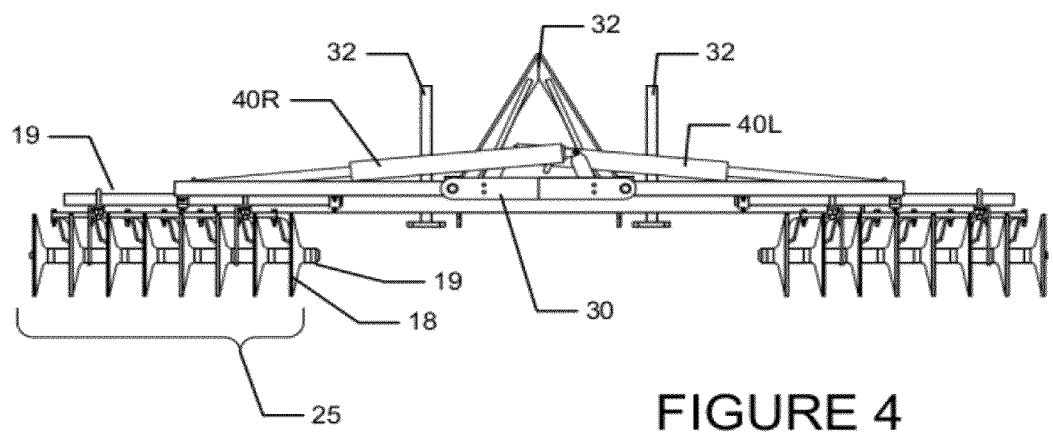
FIG. 4 is a front elevation view of the implement of FIG. 3.

As illustrated in FIGS. 2B and 2C, the lengths of arms 16 and the portions of those arms which carry tilling members 18 are selected to facilitate tilling of the soil that has been turned over in an adjacent previous pass of plough 12. The portion 25 (see FIG. 4) of arms 16 which carry tilling members (e.g. disc blades 18) may be at least approximately the same length as the width covered in each pass of plough 12.

In some embodiments, portion 25 is slightly longer than the width of each pass of plough 12 to provide some overlap between the strips tilled in successive passes of tilling apparatus 15. Although farmers like to do a neat job of field preparation, ploughing does not require high precision. Portion 25 is offset from a centerline of tractor 10 to coincide with an adjacent strip of land that has been ploughed in a previous pass of plough 12. Portions 25 may be offset by the same amount respectively to left and right sides of the tractor centerline.

In the illustrated embodiment, when the corresponding frame 33R or 33L is in its lowered configuration, the corresponding portion 25 does not extend significantly into the current path of plough 12. The tilling members of tilling apparatus 15 are arranged so as to leave a gap between the strips that can be tilled by portions 25. In the gap there are no tilling members (or in the alternative any tilling members that may be present for other applications are mounted by a retraction mechanism that may be operated to keep such tilling members retracted away from the ground to allow for operation of tilling apparatus 15 as described herein). In the illustrated embodiment, tilling members of either one of portions 25 may be engaged with the ground to till the soil without bringing any tilling members into engagement with the ground in a strip extending more-or-less the width of plough 12. This allows plough 12 to work on clean, un-cut soil. Apparatus 15 may be configured such that, with plough 12 configured to plough to one side, when the arm 16R, 16L corresponding to that ploughing direction is in its lowered configuration, the corresponding portion 25 may have its innermost edges in line with or nearly in line with the edge of the strip being currently ploughed by plough 12 and extend outwardly (away from the centreline of tractor 10) from that point.

In the illustrated embodiment, when a frame 33R or 33L is in its lowered position, the corresponding portion 25 begins approximately even with the outside edges of tires 11 of tractor 10. Leaving at least part of the track of tires 11 untilled is advantageous since the soil on which tires 11 drive can remain undisturbed by tilling apparatus 15, thereby maintaining traction.

Advantageously, apparatus 15 may be configured such that, when a right arm 16R is in its lowered configuration, the corresponding tilling members are positioned to engage the ground in a first strip that is offset to the right side of tractor 10 and when left arm 16L is in its lowered configuration, the corresponding tilling members are positioned to engage the ground in a second strip that is offset to the left side of the tractor and the first and second strips are spaced apart from one another by a third strip. Advantageously the third strip may extend into the track of tires 11 past the inner edges of tires 11. In some embodiments, the track of tires 11 may be entirely within the third strip. Depending upon its width, plough 12 may plough a strip that substantially lies within the third strip.

FIGS. 3 through 10C show some details of construction of an example embodiment of tilling apparatus 15. In the illustrated embodiment, arms 16R and 16L respectively comprise frames 33R and 33L.

Apparatus 15 comprises a central frame 30 which includes a coupling 32 for mounting to the front of a tractor 10. In some example embodiments, coupling 32 comprises a 3-point hitch coupling that couples to a front-mounted 3-point hitch assembly on the front end of tractor 10. In alternative embodiments, frame 30 could be bolted or otherwise affixed to the front of tractor 10.

Swinging frames 33R and 33L are pivotally attached to central frame 30. A disc assembly 34 is attached to each of swinging frames 33R and 33L. Disc assembly 34 comprises a member 36 to which is rotatably mounted a shaft 19 which carries disc blades 18.

Actuators (for example hydraulic cylinders) are coupled between mounting points on central frame 30 and corresponding mounting points on swinging frames 33R and 33L. The illustrated embodiment includes hydraulic cylinders 40R and 40L which are respectively coupled to raise and lower swinging frame 33R and swinging frame 33L.

In a simple embodiment, hydraulic cylinders 40R and 40L are controlled by means of auxiliary hydraulic circuits (not shown) of a tractor 10. Control levers for controlling each of these auxiliary hydraulic circuits may be provided in a cab of tractor 10. By operating the control levers, a driver of the tractor can individually control each of swinging frames 33R and 33L to move between its raised and lowered positions and to stay in the selected raised or lowered position.

Some embodiments provide a more automatic control. In such embodiments, a single control lever or other user interface may be provided which has positions or commands for left frame 33L down (and right frame 33R up); right frame 33R down (and left frame 33L up); and transport position (both right and left frames 33L, 33R up).

Figure 10A:
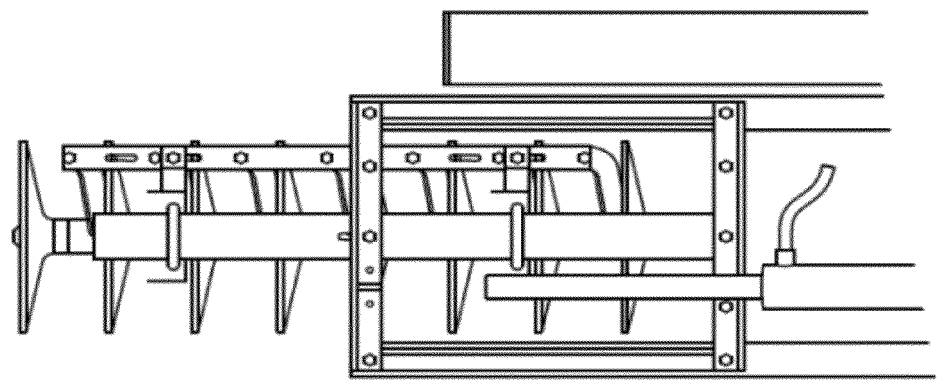
FIGS. 10A, 10B and 10C are top plan views showing the end of one arm of the implement of FIG. 3 and illustrating how an angle of a soil tilling member may be adjusted.
Figure 10B:
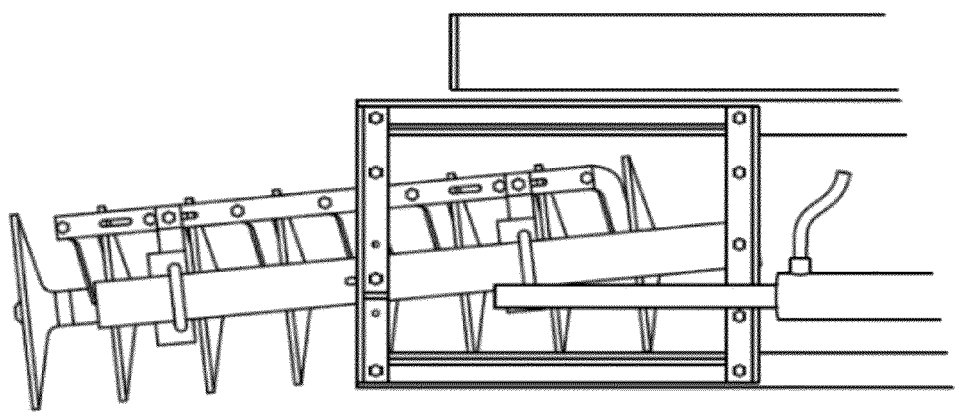
Figure 10C:
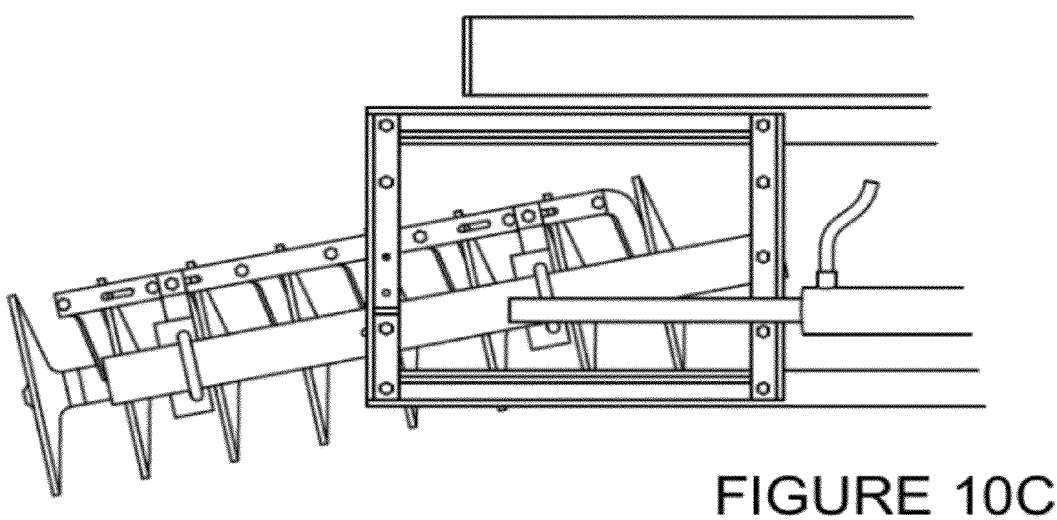

Members 36 may be angled relative to the direction of travel of tractor 10 to provide a desired tilling action. As illustrated in FIGS. 10A to 10C, some embodiments permit the angles of members 36 to be varied to modify tilling action of disc blades 18.

Figure 11:
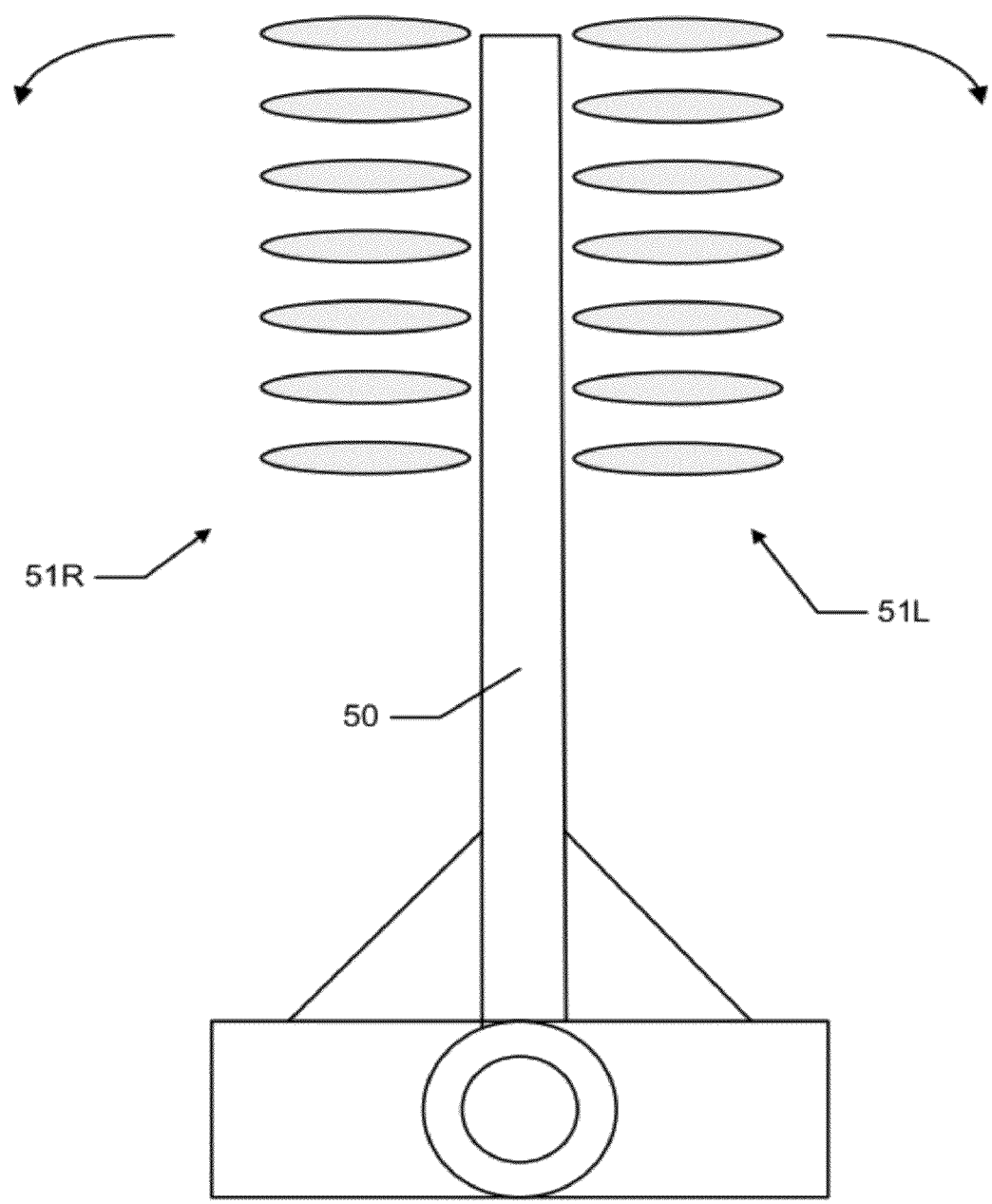
FIG. 11 is a front elevation view of an implement according to an alternative example embodiment.

Since only one of left and right arms 16L and 16R is being deployed at a time in normal operation, an alternative embodiment as shown in FIG. 11 has only a single arm that can be swung between left and right sides of a tractor 10. In the FIG. 11 embodiment, single arm 50 carries first and second sets 51L and 51R of tilling members. Arm 50 can be carried in a central upright position for transport. Additionally, arm 50 can be swung to the left to bring tilling members 51L into contact with soil on the left-hand side of tractor 10. Arm 50 can be swung to the right to bring tilling members 51R into contact with the soil on the right-hand side of the tractor. Any suitable actuator may be applied to swing arm 50 between its positions and to hold arm 50 in a position after that position has been selected. For example, the actuator could comprise a hydraulic motor, a rack and pinion mechanism, a hydraulic piston, or the like.

Other constructions are also possible. For example, front-mounted tilling members on either side of a tractor 10 may be mounted so that they can be independently lifted away from engagement with the soil or lowered to engage and till the soil by means of a mechanism which lifts and lowers the members in a generally vertical direction.

Alternative types of tilling members may be provided. For example, motor-driven rotary tiller blades may be mounted in place of disc blades 18. Such blades may be driven, for example, by means of a hydraulic motor connected to be driven by pressurized hydraulic fluid supplied from tractor 10. Movable or fixed, driven or non-driven tines may be provided instead of or in addition to disc blades 18. Instead of being mounted on the front of a tractor 10, arms 16R and 16L could be mounted to sides of tractor 10 so that they can be lowered to bring tilling members into position to till a previously-ploughed strip of soil.

While it is most efficient to use an implement as described herein together with a tumble plough, some embodiments comprise a single-bottom plough. Such embodiments require only a single arm that can be lowered to bring tilling members into contact with a strip of land ploughed in a previous pass. The single arm may be mounted on the side of the tractor toward which the plough turns the soil.

Preferably the tilling members are mounted so that, when they engage the ground at least inside edges of tires of the tractor 10 drive on ground that has not been tilled by the tilling members. For example, the tilling members may be mounted so that they till a strip of land beginning just outside of the tractor's front wheels and extending outward (away from the centerline of the tractor) for the width of the plough being pulled by the tractor or slightly farther.

Although tractor 10 is depicted as having tires, the invention may be applied using a tractor having tracks. Tractor 10 is not required to be a purpose-built agricultural tractor but may be a crawler tractor or any other vehicle capable of application as described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. Method for preparing soil, the method comprising:
   with a tractor, pulling a plough to plough a first strip of ploughed land;
   driving the tractor adjacent to the first strip pulling the plough to plough a second strip of ploughed land contiguous with the first strip; and,
   while ploughing the second strip, tilling substantially all of the first strip with a first tilling member mounted to the tractor forward of the plow and projecting to a first side of the tractor.

2. A method according to claim 1 wherein the plough is a tumble plough and the method comprises flipping the plough between ploughing the first strip and ploughing the second strip wherein ploughing the second strip is performed in a direction opposite to a direction in which the first strip was ploughed.

3. A method according to claim 2 comprising driving the tractor adjacent to the second strip to plough a third strip contiguous with the second strip and, while ploughing the third strip, tilling the second strip with a second tilling member projecting to a second side of the tractor opposite to the first side.

4. A method according to claim 3 wherein the first and second tilling members are supported on first and second arms that are pivotally mounted to the tractor and the method comprises pivoting the first arm to bring the first tilling member into contact with the soil before beginning to plough the second strip.

5. A method according to claim 1 comprising keeping at least inside edges of tires of the tractor on ground that has not been tilled by the tilling member.

6. A method according to claim 1 comprising leaving the second strip substantially untilled until ploughed.

* * * * *